United States Patent Office 3,009,821
Patented Nov. 21, 1961

3,009,821
RED OXIDE OF IRON
Leonard M. Bennetch, Bethlehem, Pa., assignor to C. K. Williams & Co., East St. Louis, Ill., a corporation of Delaware
No Drawing. Filed Mar. 5, 1957, Ser. No. 643,940
6 Claims. (Cl. 106—304)

The present invention relates to new and improved red iron oxide of the type used as pigments incorporated in paint, enamel and lacquer compositions, and in natural and synthetic rubber and other plastic compositions, as well as in cement, stucco and the like.

It is among the objects of the invention to provide a uniform iron oxide product of soft texture, with no marked tendency to agglomerate and characterized by particle sizes considerably less than one micron and having color shades easily predetermined and controlled anywhere within the range between the lightest red and the deepest maroon.

Another object is to provide a red iron oxide that may be used in wet filter cake form as a pulp color for aqueous dispersion, as in imprinting wall paper, in emulsion paints, and in the coloring of cement and stucco or the like, and which may be readily converted by substituting any of a wide variety of suitable organic media for water to produce a flush color of any desired specification.

Another object is to provide a richer shade of red iron oxide without adding costly organic dyestuffs, lakes or toners to red ferric oxides of the types that are known to the paint, enamel and lacquer industries.

Another object is to provide red iron oxides, either in the hydrated form or in the anhydrous form, the latter being produced from the former by a simple procedure without the generation of fumes, to yield a product of deepened color and enhanced tinctorial value.

Another object is to provide red iron oxides of any desired shade in extremely minute particles that render the same especially advantageous as the pigment component of rubber, natural and synthetic, and other plastics.

This application is a continuation-in-part of my copending application Serial No. 309,949, now U.S. Patent No. 2,785,991, which in turn is a continuation-in-part of my application Serial No. 749,861, filed May 22, 1947, now abandoned.

The processes by which the red iron oxides of the invention are produced involve the formation of colloidal iron oxide seed by reacting a ferrous salt in solution with close to its combining proportion of alkali, oxidizing, and thereafter precipitating red oxide of iron in ferrous salt solution containing said seed, all as set out in more detail herein. X-ray analysis of the product shows that iron oxide crystals are present having the hematite or hydrohematite structure. Electromicrographs of the particles, whether they are light red or deep maroon in color, reveal that they invariably are a mixture of different crystals and are composed of hematitic oxide particles which are hexagonal, rhombohedral crystals appearing as rounded particles and particles which are orthorhombic, acicular particles dispersed throughout the mass, appearing as prisms.

The percentage of the respective crystals in the red iron oxide products depends in substantial part upon the ratio of ferrous salt to alkali used in producing the seed and upon the amount of ferrous salt added to the seed solution with the metallic iron and present during the oxidation reaction leading to the production of the red iron oxide pigment.

The precipitated red oxides of iron pigments of the invention result from a starting seed in which the proportion of alkali is between 0.9 and 1.1 equivalent parts per equivalent part of iron salt. In this narrow range of proportions alone is the seed produced leading to the production of the red oxides in the subsequently employed pigment producing step. If a greater or lesser proportion of alkali is employed, the yellow oxide of Goethite structure inevitably results.

In a preferred procedure, the colloidal seed suspension is prepared by combining ferrous salt, preferably copperas, $(FeSO_4 \cdot 7H_2O)$, in aqueous solution under atmospheric pressure and temperature, with a solution of alkali, preferably sodium hydroxide, to form an aqueous slurry. Adding the iron salt solution to the alkali is somewhat preferable to adding alkali to iron salt solution, as it yields a slurry of lower viscosity which is more easily mixed.

While copperas is ordinarily preferred as the iron salt because of its low cost, as is sodium hydroxide as the alkali, other iron salts and other alkaline agents may be employed. Among numerous other ferrous salts, the ferrous chloride or acetate or mixtures thereof may be employed. Among other alkalis, ammonium hydroxide, sodium carbonate and calcium hydroxide may be used.

In one illustrative practical manufacturing procedure, 1900 pounds of caustic soda are dissolved in water to make 4500 gallons of solution and 6600 pounds of copperas are dissolved in water to make 4500 gallons of solution. This is practically one equivalent of alkali per equivalent of iron salt. The latter solution is pumped into the former and dispersed by stirring. The ferrous hydroxide slurry thus made is subjected to oxidation, preferably by blowing air therethrough at room temperature, thereby forming the desired colloidal iron oxide seed or starting material.

This seed is further processed by heating to 50° to 100° C., but preferably 70° to 80° C., under conditions to develop upon the seed a precipitate of red oxide of iron. The desired precipitate of red oxide of iron upon the seed may be accomplished under the temperature conditions mentioned, by adding copperas crystals or solution to establish an iron salt concentration of 0.1 to 0.5 pound per gallon which serves as a catalyst and then introducing metallic iron such as mild steel scrap, and resuming oxidation preferably by blowing air through the processing tank until the initial seed material has matured and grown to the desired shade of precipitated red iron oxide.

In an alternative procedure, the initial starting slurry may be caused to mature and develop into red oxide of iron under the temperature conditions mentioned, by using alkali instead of metallic iron in the final hot phase of the process. In this modification, alkali as for example soda ash, is added to the hot starter slurry under oxidizing conditions at such a rate that the pH value of the slurry does not exceed 4.0. Thus the iron oxide necessary for the growth of the initial starting seed is furnished by the reaction of alkali and iron salt solution rather than by the direct oxidation of metallic iron, as in the first procedure. The addition of alkali is continued, and additional iron salt added from time to time to insure its presence in the slurry, until the desired shade of red oxide of iron has developed, at which time the process is ended.

When the desired red iron oxide is obtained by either of the alternative procedures set forth, the pigment is separated from the slurry by known procedures of centrifugation or filtration, and is then washed and dried and the dried cake readily disintegrated.

This process will yield a light shade of red oxide in about 24 hours of operation and may be carried on to yield the deepest shade of maroon in less than one week of operation.

This is sharply to be contrasted with the use of proportions of alkali outside of the critical range of 0.9 to 1.1 equivalents of the iron salt in which in about a week of operation a light shade of yellow oxide of iron is produced and several weeks of such continuous operation would be required to produce the deepest commercial shades of yellow.

By virtue of the aqueous medium in which precipitated red iron oxides are prepared according to the present invention, the product contains a small amount of combined water and thus is hydrated. This combined water is greatest in the light red oxide and least in the deep shades but in every case is less than one molecule of combined water per molecule of ferric oxide. This is a distinction over yellow oxide of iron which has a greater proportion, that is, one full molecule of combined water per molecule of ferric oxide. Commercial yellow oxide of iron contains 10 to 12% of combined water whereas the precipitated red oxides of the present invention contain but 2 to 8% of water.

If the water combined in the red oxide of the present invention is driven off by heat treatment for 10 minutes at about 1150° F., the red color is slightly deepened with some increase in tinctorial value. The mass tones of the precipitated reds, both before and after heat treatment, according to the present invention, are richer in color value than are corresponding shades of calcined copperas red oxides or calcined yellow oxides of iron.

In operating between the critical limits set forth in combining proportions of alkali to iron salt of 0.9 to 1.1, the starting seed is generally a hydrous ferric oxide, red in color, but it has been found that where the proportion of alkali used between the critical limits set forth, is between 0.95 and 1.0 part, the seed may be dark brown to black in color, indicating the presence of some hydrous ferrous oxide in combination with the hydrous ferric oxide. On further processing of such seed, the desired precipitated red oxide nevertheless results, so that the critical range of alkali, as above set forth, is anywhere between 0.9 to 1.1 molecular equivalents of the iron salt used in making the seed.

It will be understood that the ingredients used in the preparation of the red oxide, according to the present invention, are commercial products which are far from chemically pure. Analysis of commercial forms of yellow iron oxide produced from impure chemicals, as well as of the red iron oxide produced according to the present invention from like impure chemicals, shows a substantial divergence in the percentage of anhydrous ferric oxide present in the final product from that which would be expected were the product chemically pure. Thus while chemically pure yellow iron oxide, $Fe_2O_3.H_2O$, would have 89.8% of anhydrous ferric oxide, there is present only 87.6% of such anhydrous ferric oxide in the commercial product, the difference being accounted for by various impurities including mainly sulfur trioxide and also aluminum and titanium oxides, silica and uncombined moisture.

In the product of the present invention produced from commercial grades of copperas and commercial grades of sodium hydroxide, the percentage of anhydrous ferric oxide would be from 88.4 to 96.0, depending on the shade in the range between the lightest red and the darkest maroon, where the like chemically pure product would range in percentage of anhydrous ferric iron oxide between 91.0 and 98.0. Earlier experimentation, using copperas and sodium hydroxide produced products in which the anhydrous ferric oxide content was calculated to vary between 88.5 and 94.5%.

The red iron oxides of the present invention would have, in a typical light shade of red, an approximate formula of $Fe_2O_3.0.88H_2O$. A typical dark maroon would show a much lower water content, the approximate formula being $Fe_2O_3.0.22H_2O$; while in a medium shade of red the formula would be $Fe_2O_3.0.5H_2O$. The proportions of water in the average molecule, between the substantial limits set forth in these apparent formulas, would vary progressively with decrease in water content as the oxide is matured from the lightest shade to the darkest shade of red.

The amount of such water in the different types of crystals in the mass, respectively, is not known, nor is it known how this content can be determined. The hematitic crystals appear to have the formula, $Fe_2O_3$, and the prisms the formula, $HFeO_2$, i.e., that of the monohydrate of ferric oxide, $Fe_2O_3.H_2O$.

In tests following the procedures specifically hereinbefore set out involving the production of the seed at the extreme ratios of iron salt to alkali of 1:0.9 and 1:1.1 (in equivalent parts), respectively, and the production of the red oxide pigments in the salt solution containing metallic iron at the extreme concentrations of copperas of 0.1 and 0.5 pound per gallon, respectively, the ratio of volume of hexagonal rhombohedral particles to acicular orthorhombic particles were determined by calculations from electron micrographs as follows:

| Run No. | Ratio salt to alkali | Ferrous sulfate concentration in lbs. per gal. | Total volume of rhombohedral particles counted | Total volume of acicular particles counted | Ratio of volume of rhombohedral to acicular particles |
|---|---|---|---|---|---|
| 1 | 1:0.9 | .50 | 280 | 990 | 0.283 |
| 2 | 1:1.1 | .50 | 446 | 295 | 1.51 |
| 3 | 1:0.9 | .10 | 2,525 | 536 | 4.45 |
| 4 | 1:1.1 | .10 | 41.2 | 13 | 3.17 |

It will be observed that the rhombohedral particles are present in predominating quantities when the alkali was used in excess (runs 2 and 4), but also when the salt was used in excess provided the ferrous sulfate was used in the lower concentration (run 3).

The particle size of the lightest shade of red, with the large proportion of water in the molecule, is well under 0.2 micron, that of the medium shade of red approaches 0.2 micron, and that of the darker shade is somewhat larger than 0.2 micron. In each shade the sub-micron particle size is considerably smaller than that of corresponding shades produced by calcination and grinding.

By reason of the chemically precipitated character of the product, the less agglomerated pigment is more uniform and softer in texture than are calcined pigments and is accordingly superior for paint, enamel and lacquer compositions and is especially desirable for coating compositions that are to dry to a high gloss.

The particles are more discrete and show less tendency to form agglomerates than where they are prepared by calcination and of course there is no tendency to sinter and the soft product admits of ready disintegration without resort to the elaborate roller mill or wet grinding used in the handling of the calcined product.

The minute particles obtained by the process are of uniform color and soft texture and in the preferred composition are predominantly of "rounded" character, rounded in the sense that they have diameters of substantially the same length in all axes and have a circular appearance under electron-micrographic examination. The product is especially suitable for incorporation in natural or synthetic rubber or other synthetic plastics or plastic compositions.

The pigment prepared by the precipitation process disclosed herein can be used as a pulp color in a liquid medium, and may conveniently be converted to a flush color by replacing the aqueous mother liquor by a suitable organic medium.

The pigment may also be used in the washed and wet filter cake form wherever it is to be employed in aqueous dispersions, such as for instance in imprinting wall paper and for incorporation in cement, stucco and the like. In all of these applications, the pigment has a higher degree of dispersion in the precipitated form than in the calcined form.

The mass, tone or color of the hydrous reds produced is richer and warmer than the corresponding shades of anhydrous calcined product, but due to the combined water content and fine particle size, the tinctorial power is less than that of the calcined product. The shade of the hydrated product prepared according to the present invention may be somewhat deepened with increase in tinctorial value, the degree of such change being greater with the lighter than with the darker product. This is readily accomplished by subjecting the hydrous red ferric oxide to heat treatment to remove that portion of the combined water required to give the desired increase in tinctorial value. Such passing off of water vapor occurs without obnoxious fumes.

The presence of the acicular prismatic crystals with the rhombohedral crystals improves the pigment suspension properties in coating compositions, and increases the film strength of surface coatings especially those subject to exterior exposure. The presence of elongated crystals generally will decrease the tendency of surface coatings to crack and check during exterior exposure.

As many changes could be made in the above process and many apparently widely different embodiments of this invention could be made without departing from the scope of the claims, it is intended that all matter contained in the above description shall be interpreted as illustrative and not in a limiting sense, except as may be required for a fair construction of the appended claims.

I claim:

1. Light red to deep maroon artificially prepared red iron oxide pigments consisting essentially of chemically precipitated mixtures of hematitic rhombohedral particles and orthorhombic acicular particles, in which substantially all of the particles are of sub-micron size, said particles collectively being composed essentially of ferric oxide and chemically combined water in a ratio of from approximately 0.2 to approximately 0.9 mol of combined water per mol of $Fe_2O_3$, the $Fe_2O_3$ content of said mixtures amounting to 88.4 to 98.0% of their weight.

2. Light red to deep maroon artificially prepared red iron oxide pigments consisting essentially of chemically precipitated mixtures of hematitic rhombohedral particles and orthorhombic acicular particles, in which substantially all of the particles are of sub-micron size, said particles collectively being composed essentially of ferric oxide and chemically combined water in a ratio of less than one mol of combined water per mol of $Fe_2O_3$, the ratio of the volume of the rhombohedral particles to that of the acicular particles being in the range of from 0.283:1 to 4.45:1.

3. An artificially prepared red iron oxide pigment consisting essentially of a chemically precipitated mixture of hematitic rhombohedral particles and orthorhombic acicular particles, in which substantially all of the particles are of sub-micron size, said particles collectively being composed essentially of ferric oxide and chemically combined water in a ratio of less than one mol of combined water per mol of $Fe_2O_3$, the volume of rhombohedral particles being predominant but amounting to not more than 4.45 times the volume of the acicular particles.

4. An artificially prepared red iron oxide pigment consisting essentially of a chemically precipitated mixture of hematitic rhombohedral particles and orthorhombic acicular particles, in which substantially all of the particles are of sub-micron size and the predominant particle size is of approximately 0.2 micron, said particles collectively being composed essentially of ferric oxide and chemically combined water in a ratio of from approximately 0.2 to approximately 0.9 mol of combined water per mol of $Fe_2O_3$, the $Fe_2O_3$ content of said mixtures amounting to 88.4 to 98.0% of their weight.

5. An artificially prepared red iron oxide pigment consisting essentially of an anhydride of a chemically precipitated red in-part-hydrated ferric oxide composed of a mixture of hematitic rhombohedral particles and orthorhombic acicular particles in which substantially all of the particles are of sub-micron size, said anhydride containing rhombohedral particles and acicular particles in a volume ratio of from 0.283:1 to 4.45:1.

6. The anhydrides of pigments as defined in claim 1.

References Cited in the file of this patent
UNITED STATES PATENTS

| 1,848,660 | Renkwitz | Mar. 8, 1932 |
| 2,620,261 | Toxby | Dec. 2, 1952 |

FOREIGN PATENTS

| 290,421 | Great Britain | May 17, 1928 |

OTHER REFERENCES

Dana: A Textbook of Mineralogy, third edition (revised by Ford), 1922, pages 431 and 432.